(12) United States Patent
Battig et al.

(10) Patent No.: US 9,729,344 B2
(45) Date of Patent: Aug. 8, 2017

(54) INTEGRATING A TRIGGER BUTTON MODULE INTO A MASS AUDIO NOTIFICATION SYSTEM

(75) Inventors: Matthew Thomas Battig, Ottawa (CA); Pedro Ivan Sanchez Andrade, Kanata (CA); Ying Du, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 630 days.

(21) Appl. No.: 12/977,753

(22) Filed: Dec. 23, 2010

(65) Prior Publication Data

US 2012/0163368 A1    Jun. 28, 2012

Related U.S. Application Data

(63) Continuation-in-part of application No. 12/770,896, filed on Apr. 30, 2010, now Pat. No. 9,344,820.

(51) Int. Cl.
*H04L 12/413* (2006.01)
*H04R 27/00* (2006.01)

(52) U.S. Cl.
CPC .......... *H04L 12/413* (2013.01); *H04R 27/00* (2013.01); *H04R 2227/003* (2013.01)

(58) Field of Classification Search
CPC .. H04L 12/413; H04R 2227/003; H04R 27/00
USPC .......................... 370/352; 709/204; 455/566
See application file for complete search history.

(56) References Cited

U.S. PATENT DOCUMENTS

| | | |
|---|---|---|
| 4,845,751 A | 7/1989 | Schwab |
| 5,406,634 A | 4/1995 | Anderson et al. |
| 6,212,282 B1 | 4/2001 | Mershon |
| 6,389,463 B2 | 5/2002 | Bolas et al. |
| 6,807,564 B1 | 10/2004 | Zellner et al. |
| 7,715,540 B1* | 5/2010 | Crespo et al. ........... 379/201.05 |
| 8,130,983 B2 | 3/2012 | Cheng |
| 2002/0072816 A1 | 6/2002 | Shdema et al. |
| 2002/0147814 A1 | 10/2002 | Kimchi et al. |
| 2003/0220705 A1 | 11/2003 | Ibey |
| 2004/0034807 A1 | 2/2004 | Rostowfske |
| 2004/0165732 A1 | 8/2004 | Arcaria et al. |
| 2005/0100158 A1* | 5/2005 | Kreiner et al. .......... 379/265.02 |
| 2005/0170366 A1* | 8/2005 | Kudo ................. C07K 14/4741 435/6.16 |
| 2006/0183505 A1* | 8/2006 | Willrich ....................... 455/566 |
| 2006/0187900 A1 | 8/2006 | Akbar |
| 2006/0221970 A1 | 10/2006 | Walter |
| 2007/0096895 A1* | 5/2007 | Sneade, Jr. ............ G08B 27/00 340/506 |
| 2007/0124756 A1* | 5/2007 | Covell ............. G06F 17/30743 725/18 |
| 2008/0052348 A1 | 2/2008 | Adler et al. |
| 2008/0194209 A1 | 8/2008 | Haupt et al. |

(Continued)

FOREIGN PATENT DOCUMENTS

WO     2006034246 A2     3/2006

OTHER PUBLICATIONS

International Searching Authority, PCT/CA2010/002024 PCT International Search Report and Written Opinion.

*Primary Examiner* — Khaled Kassim

(57) ABSTRACT

An IP-enabled speaker with a trigger button module. Activation of the button on the trigger button module activates an audio link between a user of the speaker and a user of a destination communications device.

25 Claims, 19 Drawing Sheets

(56) References Cited

U.S. PATENT DOCUMENTS

| | | |
|---|---|---|
| 2008/0221715 A1 | 9/2008 | Krzyzanowski et al. |
| 2008/0266121 A1* | 10/2008 | Ellul ................... G08B 7/066 340/584 |
| 2008/0285727 A1* | 11/2008 | Burgess ............... H04M 11/04 379/45 |
| 2009/0005014 A1* | 1/2009 | Vernick ................. 455/414.1 |
| 2009/0164034 A1* | 6/2009 | Cohen et al. ............... 700/94 |
| 2009/0196429 A1* | 8/2009 | Ramakrishnan ....... H04R 3/005 381/26 |
| 2010/0135505 A1* | 6/2010 | Graebener ............ H04R 27/00 381/82 |
| 2010/0260348 A1* | 10/2010 | Bhow ............. H04N 21/25891 381/81 |
| 2010/0303250 A1 | 12/2010 | Goldberg et al. |
| 2011/0043367 A1* | 2/2011 | Becker .................. G08B 25/06 340/577 |
| 2011/0045812 A1* | 2/2011 | Kim ..................... G06F 1/1626 455/418 |
| 2011/0071825 A1* | 3/2011 | Emori .................... G10L 25/78 704/233 |
| 2011/0154204 A1 | 6/2011 | Narayanaswamy |
| 2011/0211705 A1* | 9/2011 | Hutt .............................. 381/59 |
| 2012/0072844 A1* | 3/2012 | Lefrancois des Courtis ................ G06Q 30/02 715/736 |
| 2012/0163368 A1 | 6/2012 | Battig et al. |
| 2014/0140536 A1* | 5/2014 | Serletic, II ............ G06F 3/0481 381/98 |

* cited by examiner

INTEGRATING A TRIGGER BUTTON MODULE INTO A MASS AUDIO NOTIFICATION SYSTEM

RELATED APPLICATIONS

This application is a continuation-in-part and claims priority to U.S. patent application Ser. No. 12/770,896 filed Apr. 30, 2010.

TECHNICAL FIELD

The present invention relates generally to notification, and specifically to a method, apparatus, and system for integrating a trigger button module into a mass audio notification system.

BACKGROUND OF THE INVENTION

The use of speakers for mass audio notification has traditionally been achieved through self-contained, analogue systems. The speaker output is either driven in real-time by an announcer or by a pre-recorded message which may be automatically created by a computer system, manually recorded by the announcer, or both. These standalone speaker systems, while usually reliable for day-to-day operation, present a number of difficulties when an attempt is made to turn them into an integral part of a full mass audio notification system. These problems include:
- Limited or non-existent centralized configuration options for speaker operation caused by a lack of intelligent, pro-active, reporting from the analogue speakers of their current states;
- Cumbersome maintenance due to the presence of two separated management and configuration systems: one for the digital notification system and one for the standalone analogue system;
- Limited scalability since the analogue speakers are usually constrained to operate within a concentrated geographical area due to power restrictions and cable-length limitations;
- Limited selective notification options since the standalone systems only support "notify all speakers" or intercom-like operations The introduction of an IP-based Mass Notification System, as described in U.S. patent application Ser. No. 12/770,896 filed 30 Apr. 2010, removes the limitations of traditional analogue-based systems. Using an IP network to connect speakers to a centralized Mass Notification Management Center (MNMC) removes the geographical constraints. Instead of dedicated analogue resources, the IP-based Mass Notification System can leverage an existing IT infrastructure which is prevalent in most enterprise and campus establishments for normal operations. The Mass Notification System is only geographically limited by the reach of the existing IT network infrastructure which results in reduced system implementation costs. As well, the management limitations are removed since both the MNMC and the speakers can have the additional capability of access over the IP network. Automated management and maintenance practices can be enabled by leveraging the capability of an IP device, thus reducing the overall system operation cost. IT departments already have many automated tools implemented for such management purposes. Therefore, only exceptional behavior needs to be investigated by an IT technician or a member of security.

The biggest advantage of an IP-based system comes from the service implementation options which are enabled by intelligent IP enabled devices. For example, a subset of speakers can be selected for an announcement. As well, the numbers and types of devices which can interact with the Mass Notification System are greatly increased. In addition, IP-based systems allow intelligent devices to interact with the Mass Notification System and their level of participation with the Mass Notification System is also significantly enhanced. For example, an enterprise could enable the system to allow smartphones to create announcements that get distributed to different subsets of speakers with precise message deliveries and feedback. The possibilities are endless.

SUMMARY OF INVENTION

It is an object of the present invention to provide a new and improved IP-enabled speaker with a trigger button module. Activation of the button on the trigger button module activates an audio link between a user of the speaker and a user of a destination communications device.

In one exemplary aspect, the invention provides a device for use in communicating with a Mass Notification Management Center (MNMC), the device comprising:
  a trigger button module;
  a speaker for producing audio audible to a user of said device;
  wherein
    said speaker is an Internet Protocol capable device configured to be remotely controllable to produce said audio; and
    said trigger button module triggers at least one pre-defined action related to communications between said speaker and a destination communications device.

In accordance with a second exemplary aspect of the invention, there is provided a method for initiating a communications link between a speaker and a destination client device, the method comprising:
  a) detecting an activation of a trigger button on a trigger button module;
  b) transmitting a setup communication from said speaker to a management server;
  c) receiving an alert communication from said destination client device;
  d) activating a microphone for a user at a location of said speaker;
  e) establishing an audio communications path between said speaker and said destination client device.

BRIEF DESCRIPTION OF THE DRAWINGS

The embodiments of the present invention will now be described by reference to the following figures, in which identical reference numerals in different figures indicate identical elements and in which:

FIG. 1 is a diagram demonstrating the use of cabling to connect the trigger button module to a speaker;

FIG. 2 illustrates the connection of the logical functions of the speaker 110 with trigger button module 200 functions;

DETAILED DESCRIPTION OF THE INVENTION

The introduction of an IP-based Mass Notification System (as detailed in U.S. patent application Ser. No. 12/770,896 filed 30 Apr. 2010 at the USPTO and which is incorporated herein by reference) allows greater flexibility in the use of intelligent devices. One possible addition to the IP-based Mass Notification System is a trigger button module. Trigger buttons modules are assigned a specific function and are distributed around the campus to allow users easy access to Mass Notification System functions. For example, when paired with IP-based speakers, trigger button modules can be deployed on a campus to provide an emergency call button function, which can be used to signal an emergency and, when activated, can create a contact between the trigger button module location and a live operator in a central location. To achieve this, the trigger button module not only has a method to create the emergency signal but also has a microphone to allow for communication. When the trigger button module is activated, a live operator at the central location can continue to be in voice contact with the person who initiated the emergency call to get details regarding the emergency and to direct the correct emergency services to the scene in a timely fashion. Other functions are also possible with the trigger button module such as push-to-talk, announcements, telephony services, and more. The addition of this module to the IP-based Mass Notification System is described in this document.

Figure 1:
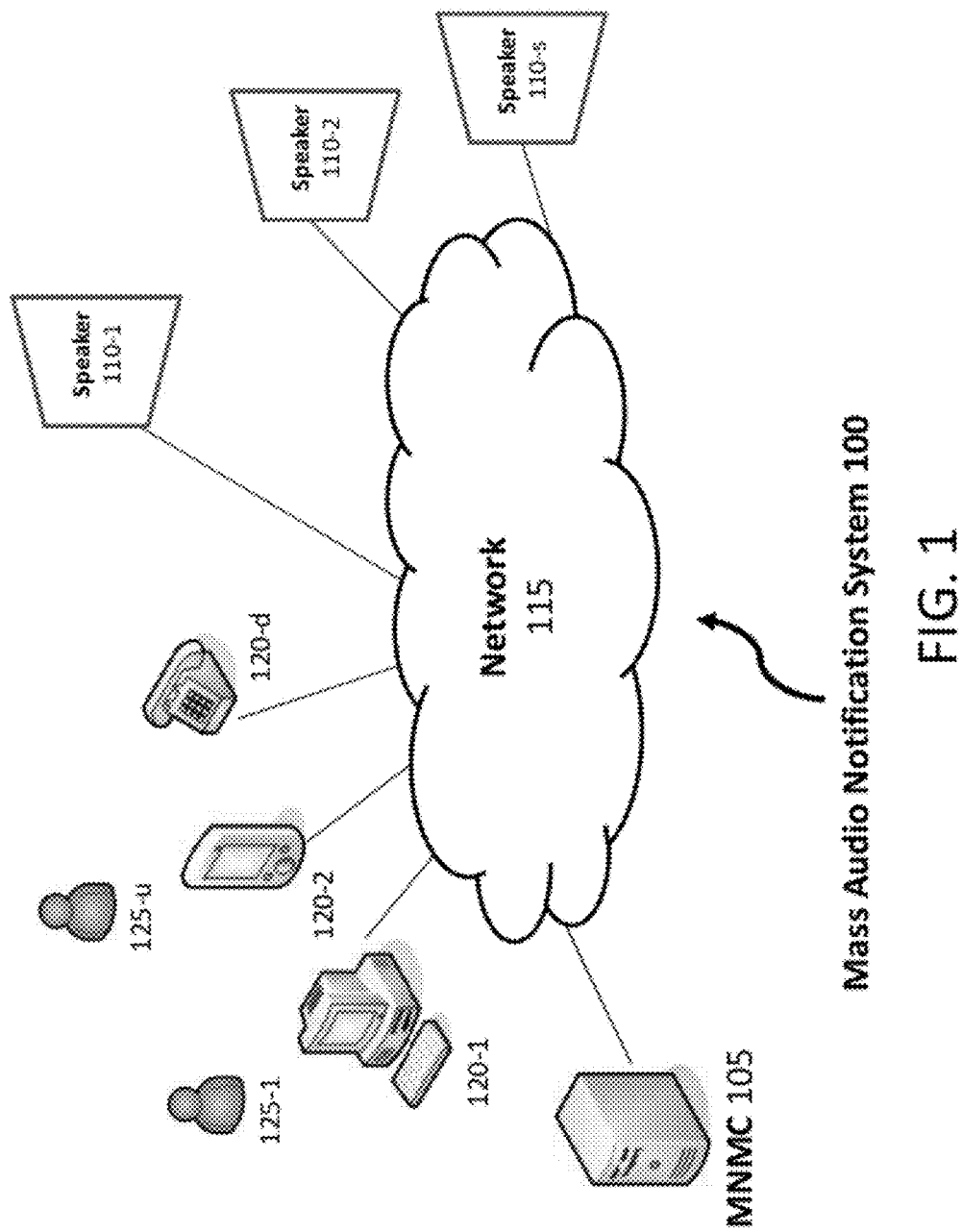
FIG. 1 is a schematic diagram of a mass audio notification system according to a non-limiting embodiment.

FIG. 1 depicts a mass audio notification system 100 comprising a Mass Notification Management Center (MNMC) 105 interconnected with a plurality of speakers 110-1, 110-2, . . . , 110-s (hereafter, generically these are referred to as speaker 110, and collectively, as speakers 110), via a network 115. Throughout this description the term speaker is also intended to include any Internet Protocol-capable device (e.g. computers, smart phones, IP phones, etc.) configured to be remotely controlled to output sound, audio, or other aural outputs such as messages. Multiple instances of the MNMC can be configured in the system 100 where some instances act as backup in case of failures. The mass audio notification system 100 is in communication with a plurality of client devices 120-1, 120-2, . . . , 120-d (hereafter, generically these are referred to as the client device 120, and collectively, as the client devices 120) by way of the MNMC 105, via the network 115. The MNMC 105 is a server that receives instructions from the client devices 120 to broadcast audio messages to the speakers 110. The client devices 120 are used by the users 125-1, . . . , 125-u (hereafter, generically these are referred to as the user 125, and collectively, as the users 125) to configure and use the system via the MNMC 105.

Figure 2:
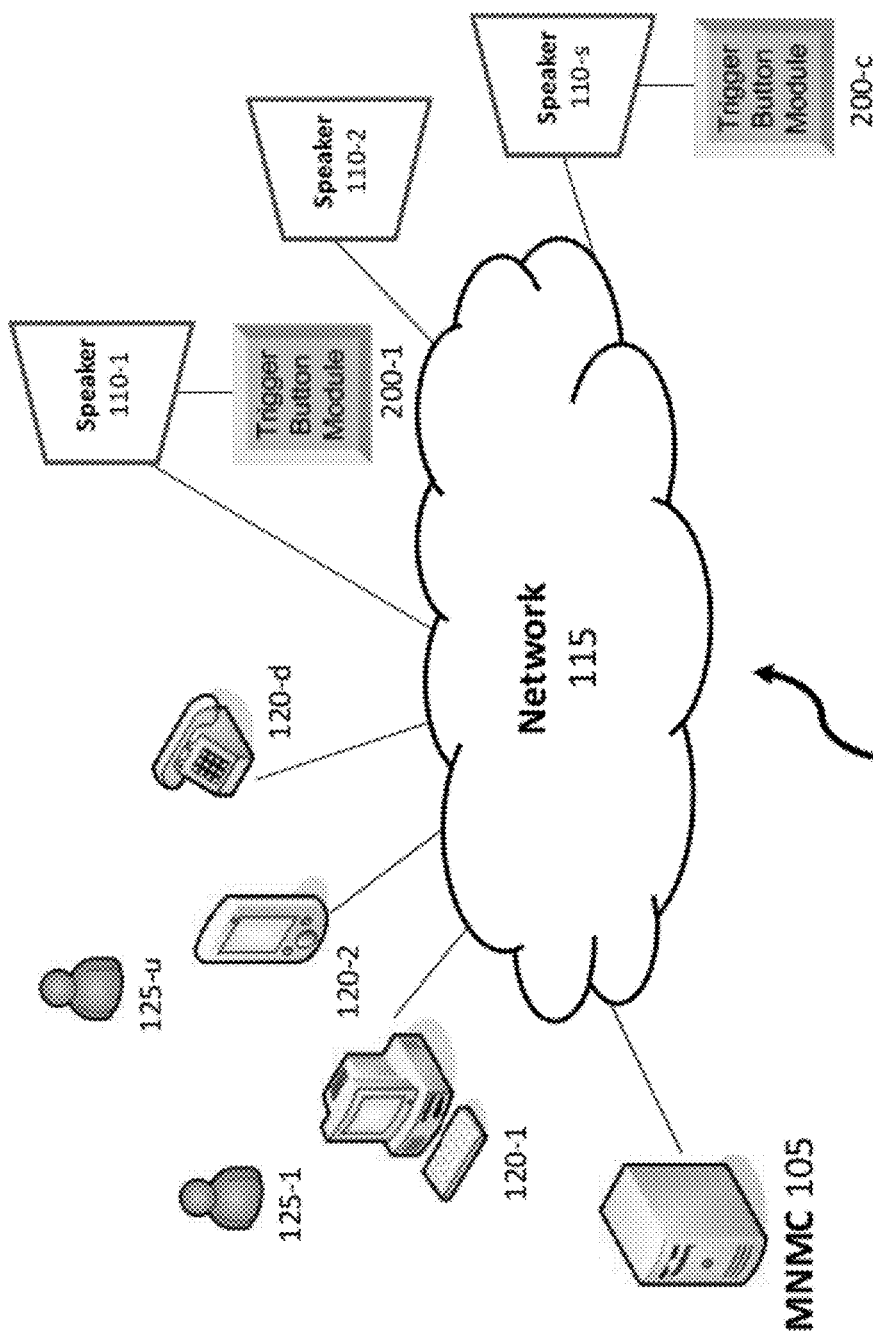
FIG. 2 is an extension of the non-limiting embodiment shown in FIG. 1 with a trigger button module attached to a speaker.

FIG. 2 extends the mass audio notification by adding one or more trigger button modules 200 which is directly connected to the speaker 110-1. This trigger button module can be used to signal building security in case of an emergency. The module can also be used to perform a predefined action such as launching a broadcast, answering a call, or performing a test. The module includes a microphone, which allows for two-way communication between the trigger button module's location and elsewhere, with the speaker emitting sound and the microphone on the button panel acting as a sound receiver. It should be noted that not every instance of the speaker 110 requires a trigger button module 200.

Figure 3:
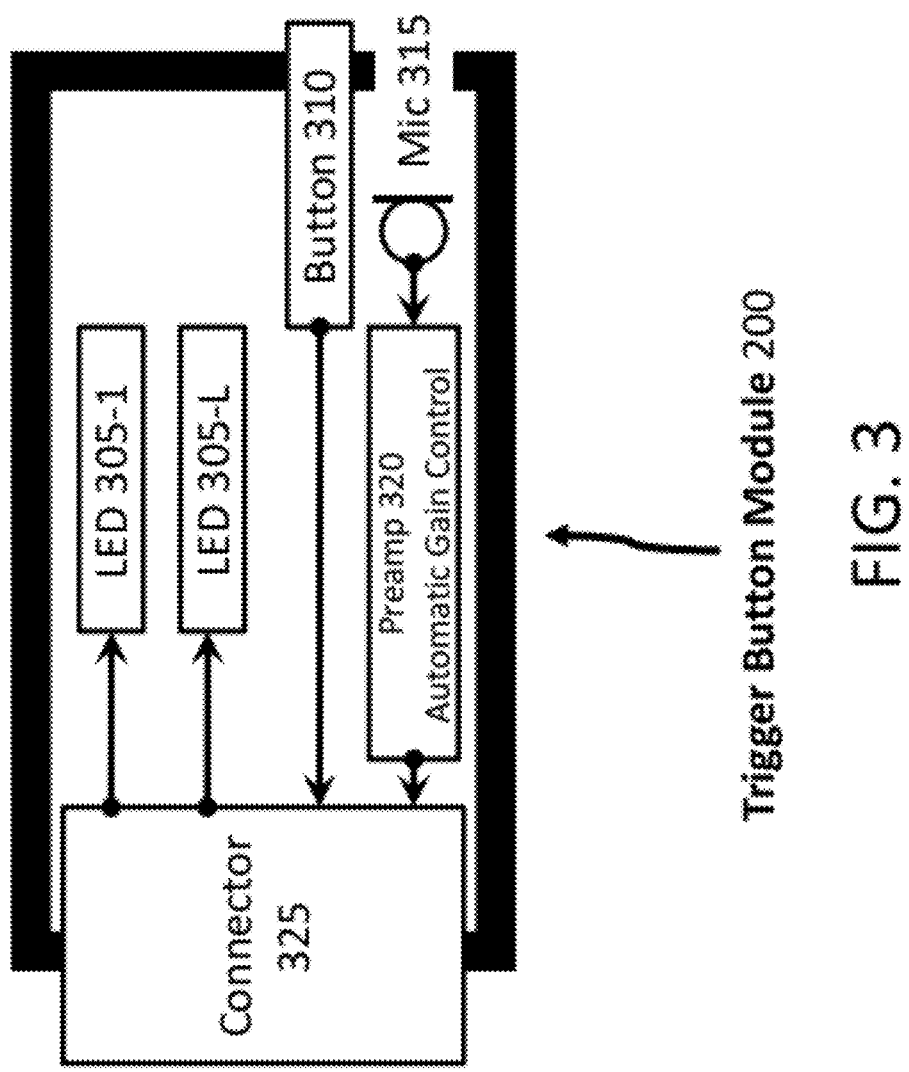
FIG. 3 is an example embodiment of a trigger button module 200.

An example embodiment of the trigger button module 200 is illustrated in FIG. 3. The button 310 may be implemented using several technologies. A Single Pole, Single Throw (SPST) button or a Dual Pole Single Throw (DPST) button may be used to initiate the trigger button module function. The button may also be used to activate an LED along with the trigger button module function. Whichever technology is selected for the button, it is preferred that the button not protrude more than a slight distance from the panel in which it is mounted and is surrounded by a bezel which is flush with the button's surface. This configuration can prevent accidental activation of the module. One alternate embodiment includes multiple buttons to provide different functions depending on which button or buttons are selected. Besides the bezel, there are no constraints on the mechanical design of the trigger button module 200 as this will allow for custom painting or labeling integrating this device into different types of decors and for different applications.

LEDs (305-1 to 305-L) may be included on the trigger button module 200 to provide a visual indication of function to the user. Pressing button 310 can toggle one or more of the LEDs 305. Releasing the button 310 will return the LEDs 305 to their original state, thereby providing a visual indication of a button push. Additional LEDs, such as LED 305-L, are provided to show the current status of the system. As an example, the LED can show whether the speaker is connected to a live operator or out of order. Depending on the specified function of the module, the microphone 315, in combination with the pre-amplifier 320, is used for voice communication.

Figure 4:
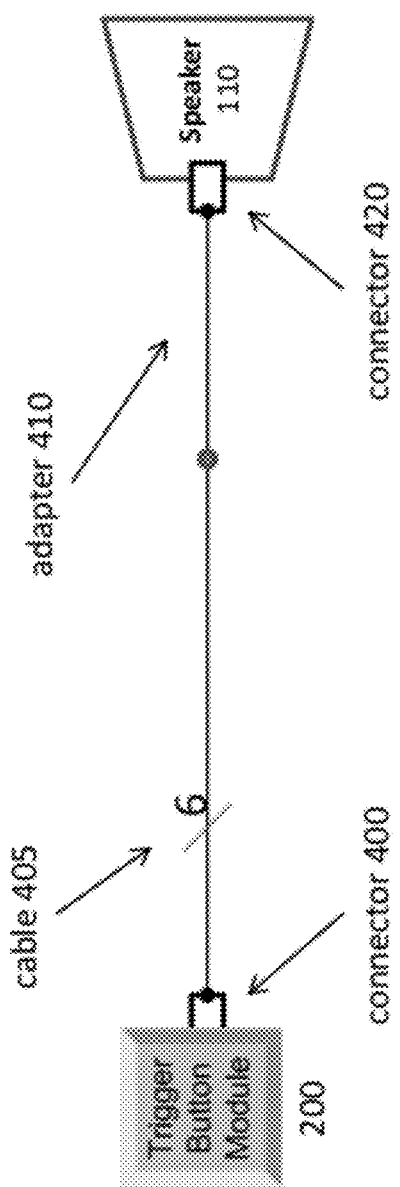

A connector 325 is used to connect the trigger button module 200 to a speaker 110. FIG. 4 shows how the trigger button module 200 can be connected to the speaker 110 using any suitable type of multi-conductor cables. In this particular embodiment, the connector 325 shown in FIG. 3 is the same as connector 400 in FIG. 4 and is connected to cable 405. The cable 405 is connected to adapter 410. The connection to the speaker 110 is completed using connector 420, which connects to adapter 410. Cable adapters 410 allow the speaker 110 to be integrated with many embodiments and variants of the trigger button module 200 from multiple vendors. The physical connections in the trigger button module and between the trigger button module and the speaker may be dictated by the application and configuration of the mass audio notification system 100.

Given the proximity of the trigger button module 200 with the speaker 110, echo cancellation might be required to avoid feedback through the mass audio notification system 100. Sounds produced by the speaker 110 might be picked up by the microphone 315 in the trigger button module 200. Without cancellation, this acoustic echo may be heard by the live operator handling the trigger button module event and this can be quite distracting and undesirable when handling an emergency situation. To avoid this, echo cancellation can be applied to the sounds picked up at the microphone 315. This function can be implemented in the hardware of the trigger button module 200 or in the software of the speaker 100 depending on the implementation of the mass audio notification system 100.

Figure 5:
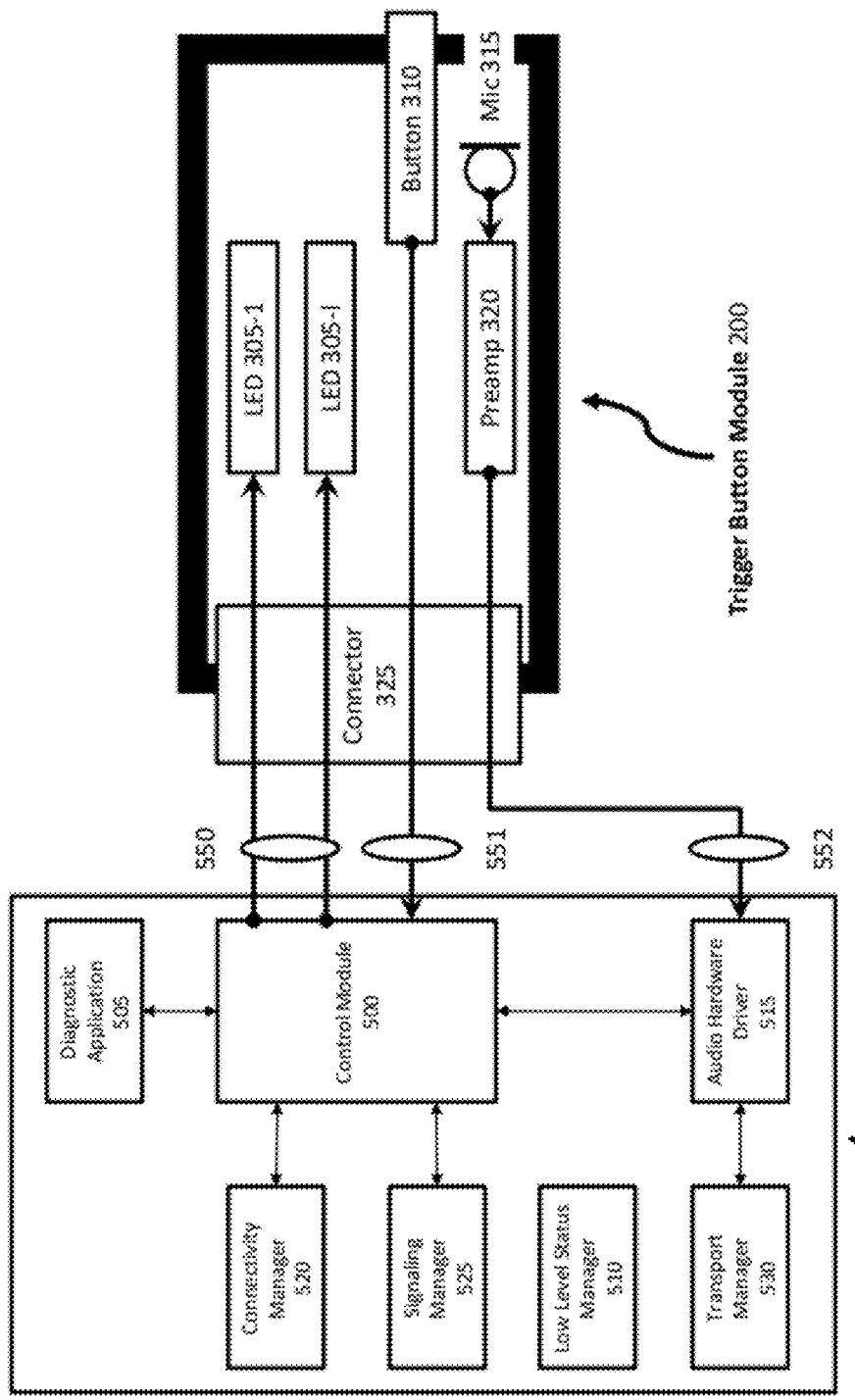

Details of the functional connection of the trigger button module 200 to the speaker 110 are described in FIG. 5. The LEDs 305 are connected to the speaker 110's Control Module 500 using control lines 550 and these control lines allow the control module to turn the LEDs on and off. Control line 551 allows the button 310 to signal the speaker 100. This is done through the control module 500 as the control module detects when the button has been pressed. The microphone 315 in the trigger button module 200 is connected to the Audio Hardware Driver 515 by way of pre-amp 320. This way, input from the microphone 315 can be integrated into media sent from the speaker 110 to the MNMC 105. The existence of Control Line 550, 551 and 552 allows the speaker 110 to detect whether or not a trigger button module unit is present. The speaker 110 can then behave accordingly when a button unit connects, and when it disconnects.

Figure 6:
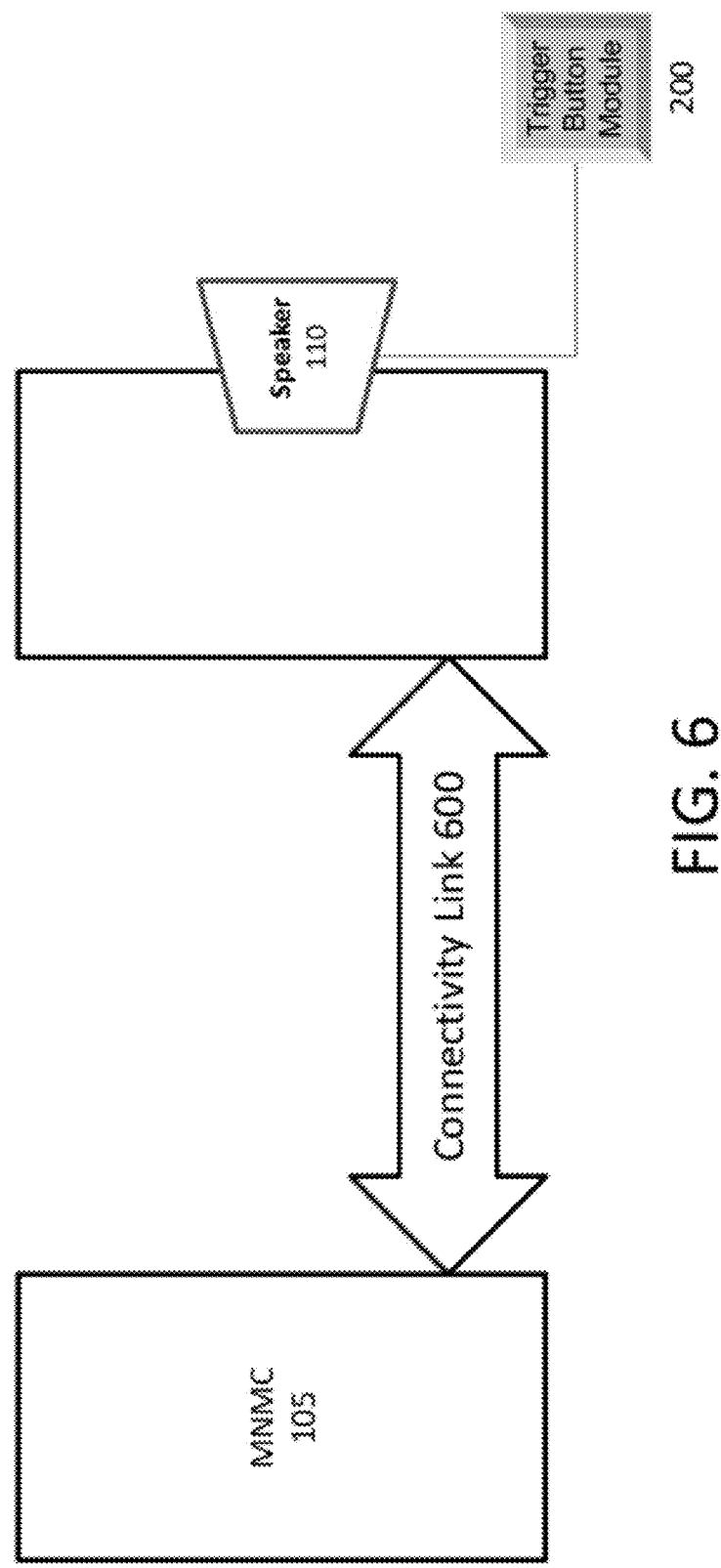
FIG. 6 is block diagram of network connections between the speaker of FIG. 5 and the MNMC of FIG. 1.

FIG. 6 depicts the network connection between the speaker 110 and the MNMC 105. The connectivity can be permanent, it can be established periodically, or it can be established each time a notification is sent. The connectivity link 600 provides a connection between the MNMC 105 and the speaker 110. The characteristics of the connectivity link may be different between implementations and may depend on the configuration and implementation of the speaker 110 and the trigger module 200. Depending on the configuration of the speaker 110, the connectivity link 600 may transport audio, interactive components (such as software modules), signalling, and operating system instructions to the speaker 110, any of which may relate to the speaker and/or to the trigger module 200.

Figure 7:
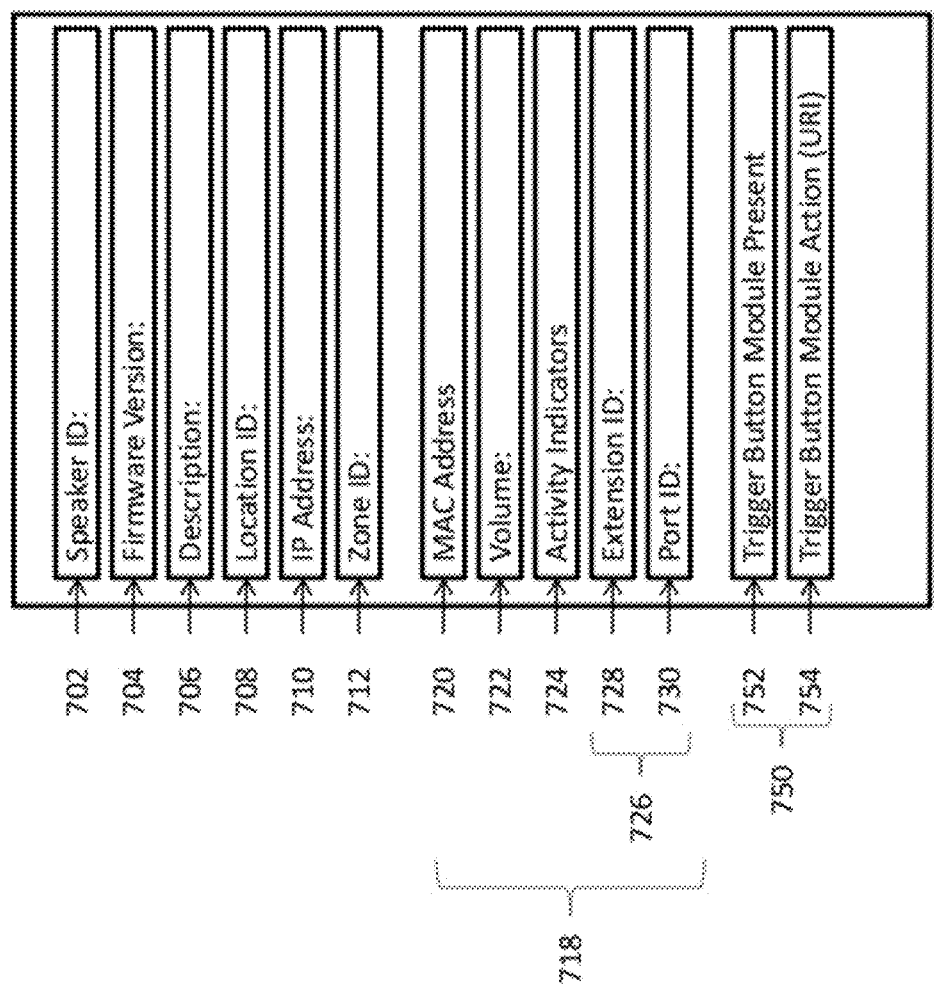
FIG. 7 is an exemplary speaker profile for the speaker of FIG. 5 adding trigger button module 200 attributes.
Figure 8:
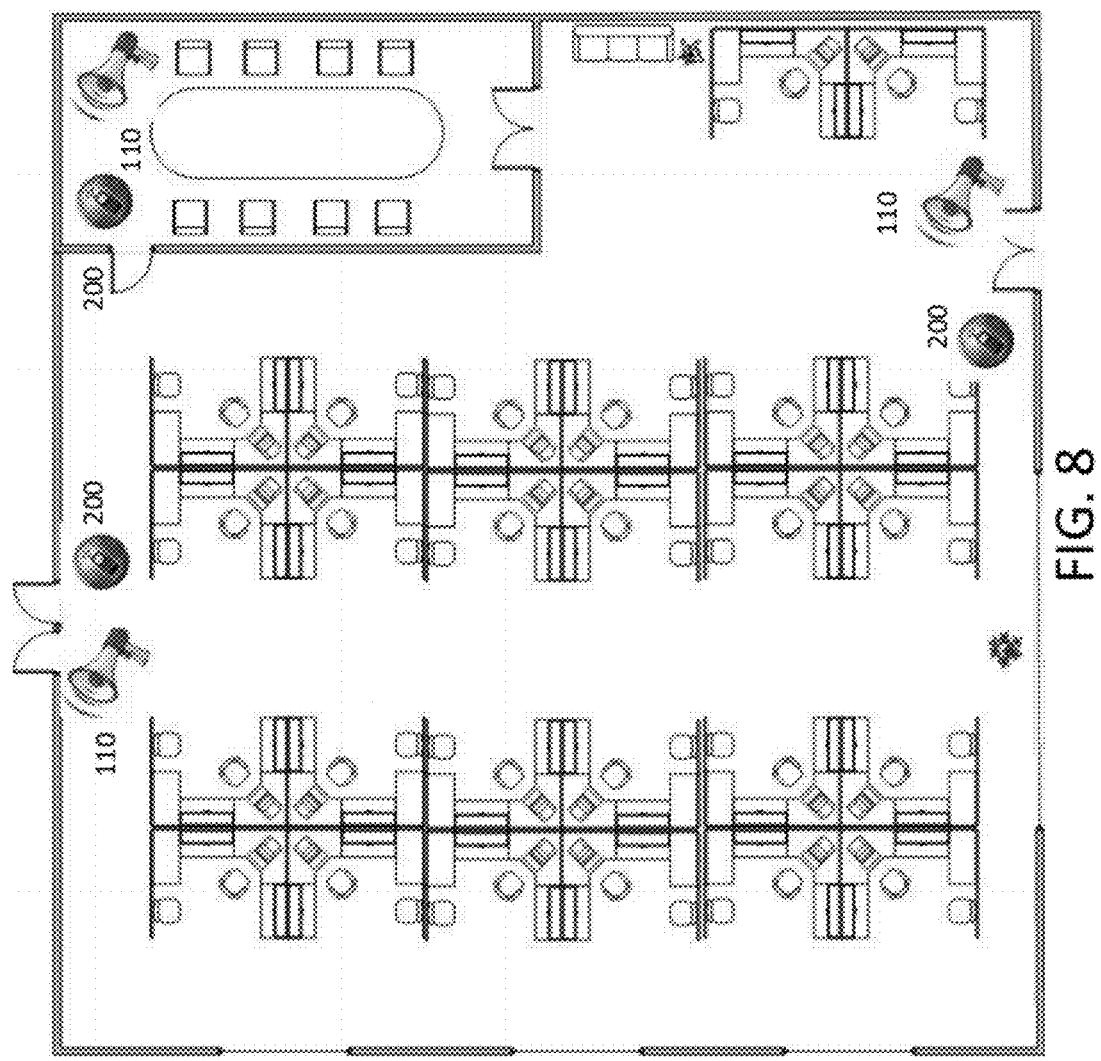
FIG. 8 is an exemplary floor plan provided by the MNMC of FIG. 1 including speakers 220 and trigger button modules 200.

When a trigger button module 200 is connected, the speaker 110 uses its network connections to the MNMC 105 to integrate the trigger button module 200 to the speaker's functions. When a trigger button module 200 is connected, the speaker 100 communicates to the MNMC 105 that the trigger button module 200 is present using the connectivity link 600. The ongoing status of the trigger button module 200 is reported by the speaker 110 to the MNMC 105. Once the trigger button module 200 has been recognized, the MNMC 105 can add the trigger button module and its attendant capabilities to the MNMC's management functions. The MNMC can then provision or configure how the associated speaker 110 will handle button presses. This provisioning or configuration is stored in a Speaker Profile 700. Each speaker's Speaker Profile is independent of and may be different from the Speaker Profiles of other speakers in the mass notification system. A sample speaker profile is illustrated in FIG. 7. This profile may include trigger button module specific attributes 750 such as whether or not a trigger button module is connected to the speaker (752) and how a trigger button press is handled (754). Actions to be taken when a trigger button is activated may be detailed in extensions to the speaker profile. For example, the trigger button module action 754 can specify a Uniform Resource Identifier (URI) which is accessed when the button is pressed. The trigger button module's attributes 750 can be expanded as new applications are envisioned and implemented. Once the trigger button module 200 is discovered, it can be added to a floor plan stored by the MNMC 105 near its associated speaker 110. A sample floor plan shown in FIG. 8 depicts an exemplary floor plan of a building having three speaker markers identifying the locations of three speakers 110. Associated with these speakers are three trigger button module 200s. Note that the invention is not limited to in-building deployments. Outdoor or any combinations of outdoor and indoor applications are also possible.

When the trigger button module 200 is pressed, the speaker 110 uses connectivity link 600 to establish a dynamic audio link. Audio from the microphone 315 is transmitted to the client device 120 using this link. The state of the specific trigger button module 200 which has been pressed can be displayed on the floor plan in FIG. 8. For example, when the trigger button module 200 is pressed, the colour of the icon representing the trigger button module may turn solid red or flash to indicate a changed state. The specific states and visual behavior of the icons would depend on the specific implementation and configuration used as well as other possible factors.

Figure 9:
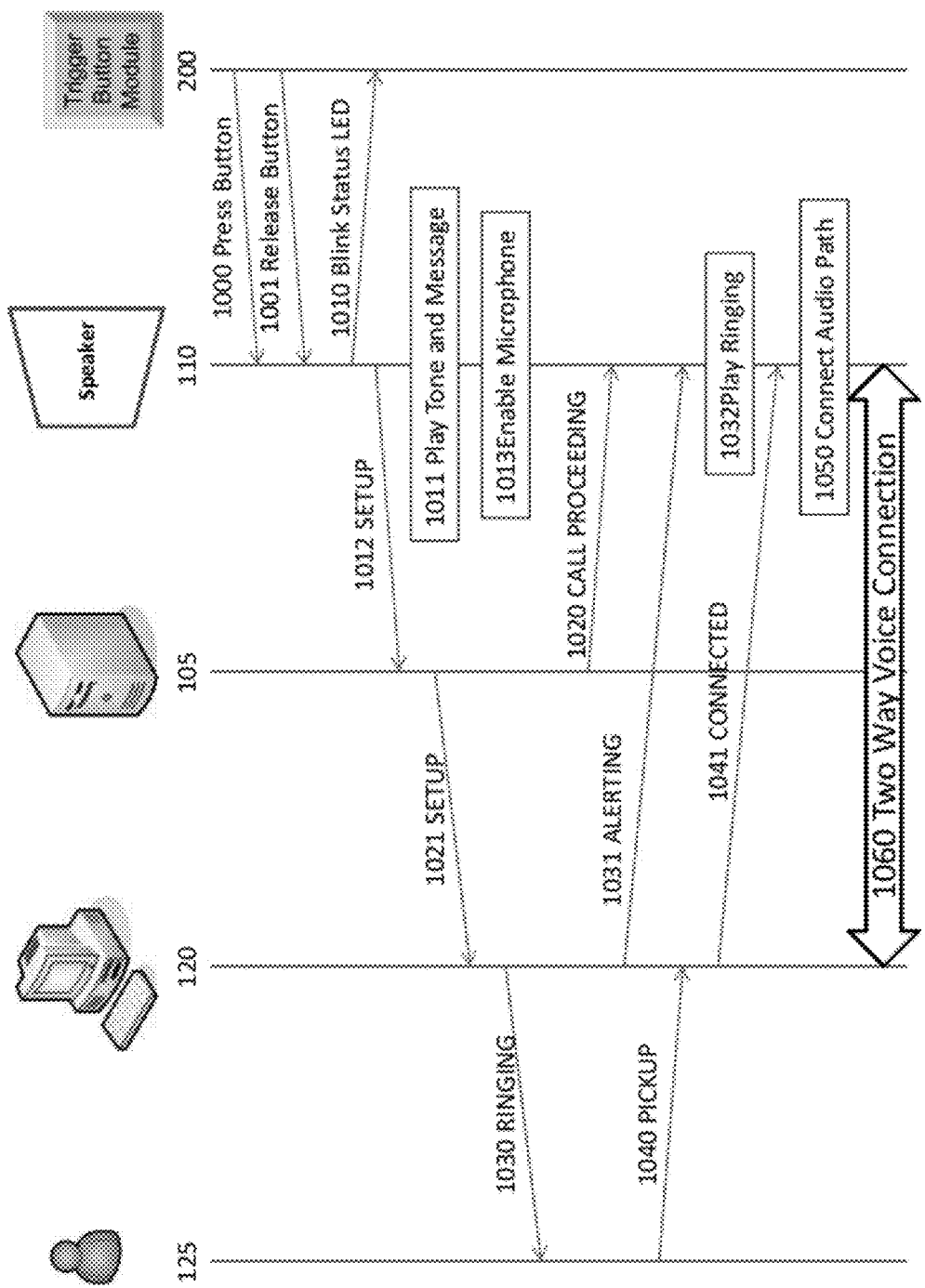
FIG. 9 is a diagram which demonstrates how a user pressing the trigger button module triggers an event.

FIG. 9 illustrates how the mass audio notification system 100 handles a trigger button module press to create a dynamic audio link. This ladder diagram is an example of the steps taken when a trigger button module 200 is pressed which places a call to a live-operator in a centralized location. In this example, it is assumed that the MNMC 105 is used as a call proxy for interactions between the speaker 110 and other client devices 120. This is used as an example embodiment and is not intended to limit the applications for which the trigger module button 200 may be used. Other embodiments are envisioned where the MNMC is not directly involved in the call set-up and the speaker 110 resolves the destination endpoint address using other means (such as DNS). Some applications, such as raising an alarm, may not involve the microphone 315 located on the trigger button module. The exact call routing method to be used depends on how the endpoints are identified in the enterprise. The endpoints can be identified as IP addresses, URLs, DIDs, strings, web services, or some combination of all these identifiers. FIG. 9 (and all other signaling ladder diagrams) uses H.323 style link establishment primitives. Other IP link establishment protocols may also be used with the mass audio notification system 100. Other establishment protocols such as SIP, RSVP, MGCP, SGCP MEGACO, Skype, or Skinny may be used. The specific protocol selected may change the types of messages used between the network elements but not the overall functionality provided by the system.

The process to create a dynamic audio link is started in FIG. 9 when the button on the trigger button module 200 is pressed (1000) and released (1001). This results in a signal and when this signal is received by the speaker 110, this indicates to the user that the trigger event is proceeding by the blinking of the status LED (1010) and the playing of an audible tone and message (1012). The speaker 110 then proceeds with the call processing by sending a SETUP request to the MNMC 105 (1011) enabling the microphone (1013) in the trigger button module. Once the MNMC 105 receives the SETUP request from the speaker 110, a CALL PROCEEDING message is sent back to the trigger button module 200 confirming that the SETUP has been processed (1021) and that the SETUP has been forwarded on to the client device 120 (1020). Before the SETUP message is transmitted, the state for the trigger button module 200 is changed and this change may be reflected on a displayed floor plan (such as) if the specific trigger button module is visible. When the SETUP message is received by the client device 120, the arrival of the incoming call is indicated by ringing (1030). Once the ringing process proceeds, an ALERTING message is sent back to the speaker 110 to let it know that the call is almost ready to proceed (1031) and the speaker, in turn, begins to play ringing tones (1032). Once the live operator picks up (1040), the client device sends a CONNECTED message to the speaker (1041) to complete the creation of the dynamic audio link. As this link is established (1050), the speaker stops ringing, it plays the received audio on this link, and the audio received from the trigger button module 200 microphone is encoded and sent to the client device 120. Two-way audio has been established (1060).

Figure 10:
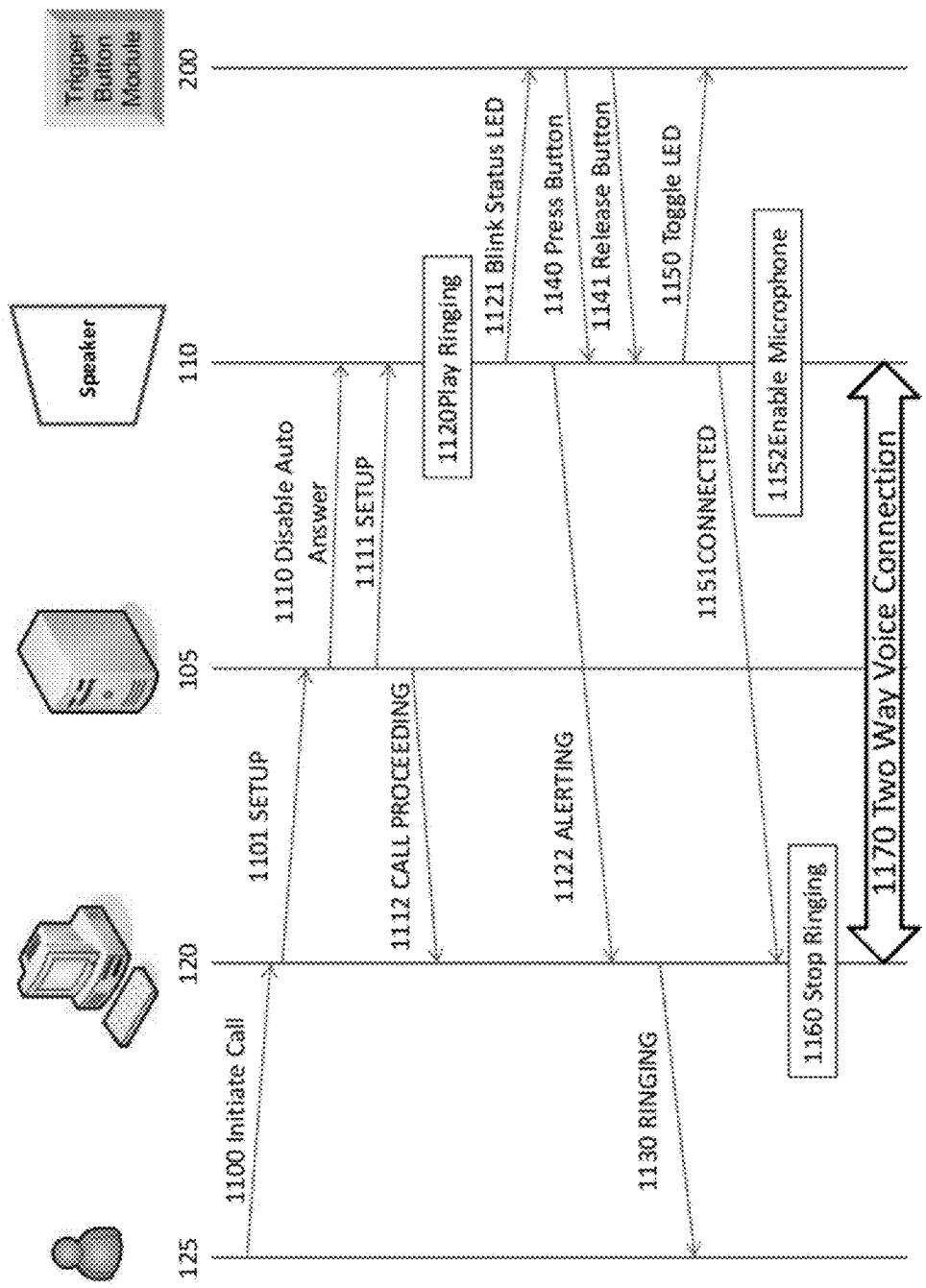
FIG. 10 is an illustration which demonstrates how a live operator can initiate a dynamic audio link to a user near the trigger button module.

A person pressing the trigger button module 200 is not the only way a dynamic audio link can be established between a client device 120 and a speaker 110. The mass audio notification system 100 can also allow client devices 120 to initiate the dynamic audio link as shown in FIG. 10. This process begins with the live operator 125 signaling its associated client device 120 to start creating the dynamic audio link (1100). The client device 120 sends a SETUP request to the MNMC 105 to route the link establishment request to the requested the speaker 110 (1101). The MNMC 105 processes the SETUP request and determines which is the speaker 110 requested by the client device 120. Depending on configurations, the MNMC 105 can configure the destination speaker 110 to not automatically answer the call (1110). The MNMC then sends a SETUP request (1111) to the speaker 110. After that, a CALL PROCEEDING message is sent back to the client device 120 indicating that the call has been successfully forwarded (1112). When the speaker 110 receives the SETUP message, it starts playing ring tones (1120). As well, the speaker begins blinking the status LED (1121) and sends an ALERTING message back to the client device 120 (1122). The client device 120 receives the ALERTING message and indicates a successful call routing to the live operator by playing ringing tones (1130). If someone responds to the ringing at the speaker 110, they can answer the call by pressing the button on the trigger button module 200. This process is handled using steps 1140 to 1141 and may incorporate visual indicators that the button on the trigger button module has been pressed. The speaker 110 indicates that someone has answered that call by sending a CONNECTED message back to the client device 120 (1151) and enables the microphone on the trigger button module 200 (1152). The client device then receives the CONNECTED message, ends the ringing (1160) and establishes the two way dynamic audio link (1170).

When the session between the live-operator and the trigger button module 200 has been completed, the dynamic audio link can be torn down. This may be handled in a variety of ways and may be dependent on the policies determined by the implementation of the trigger button module 200 as well as the application for which the module is used. If this is an emergency call application, the speaker can be configured to only allow the live operator to terminate the call. If a basic profile is implemented, then either end of the conversation can terminate the session. Other profiles allowing for behavior between the two extremes mentioned above may be implemented and selected as well.

Figure 11:
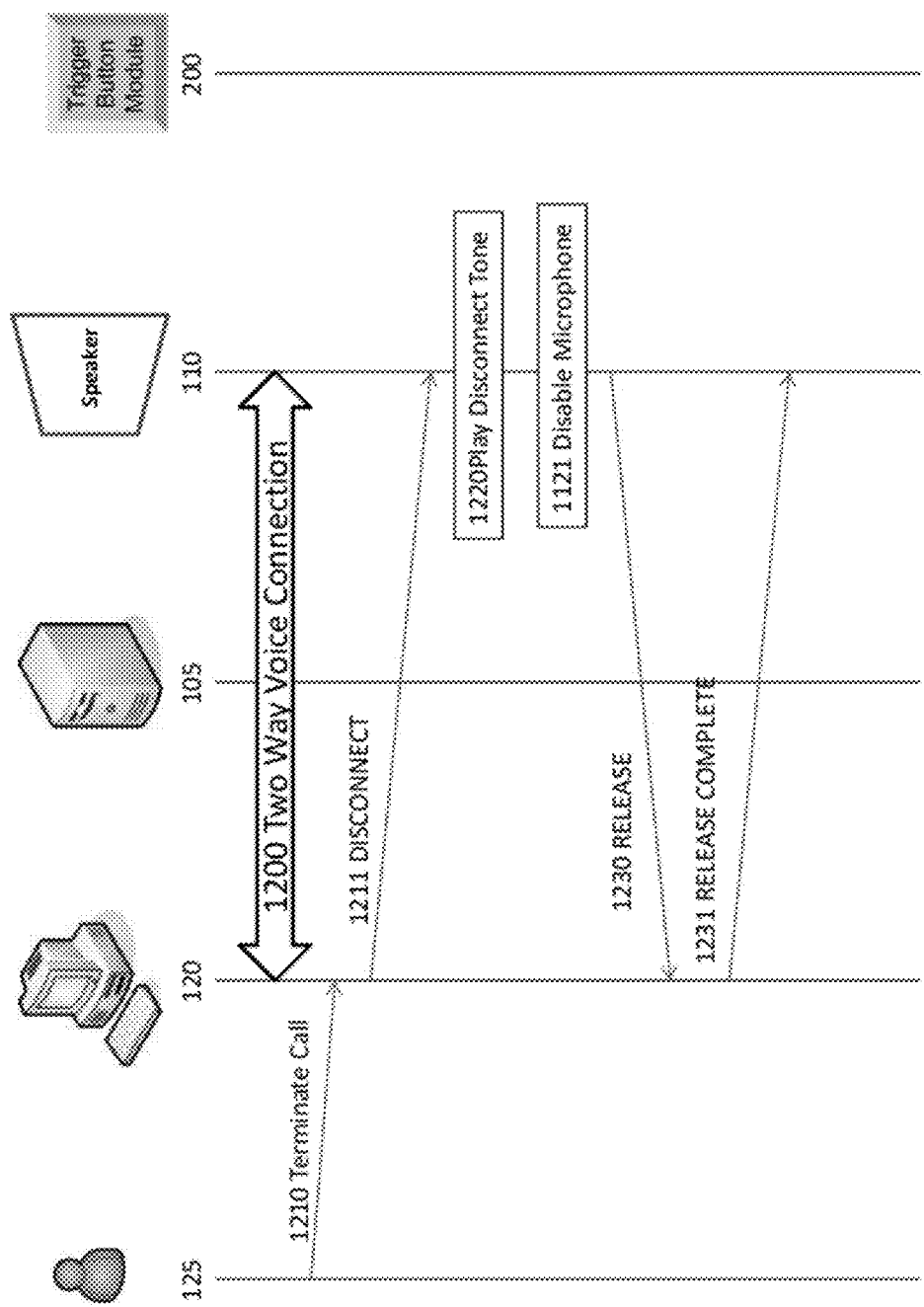
FIG. 11 is a diagram which demonstrates how a live operator can terminate a dynamic audio link to a user pressing the trigger button module.
Figure 12:
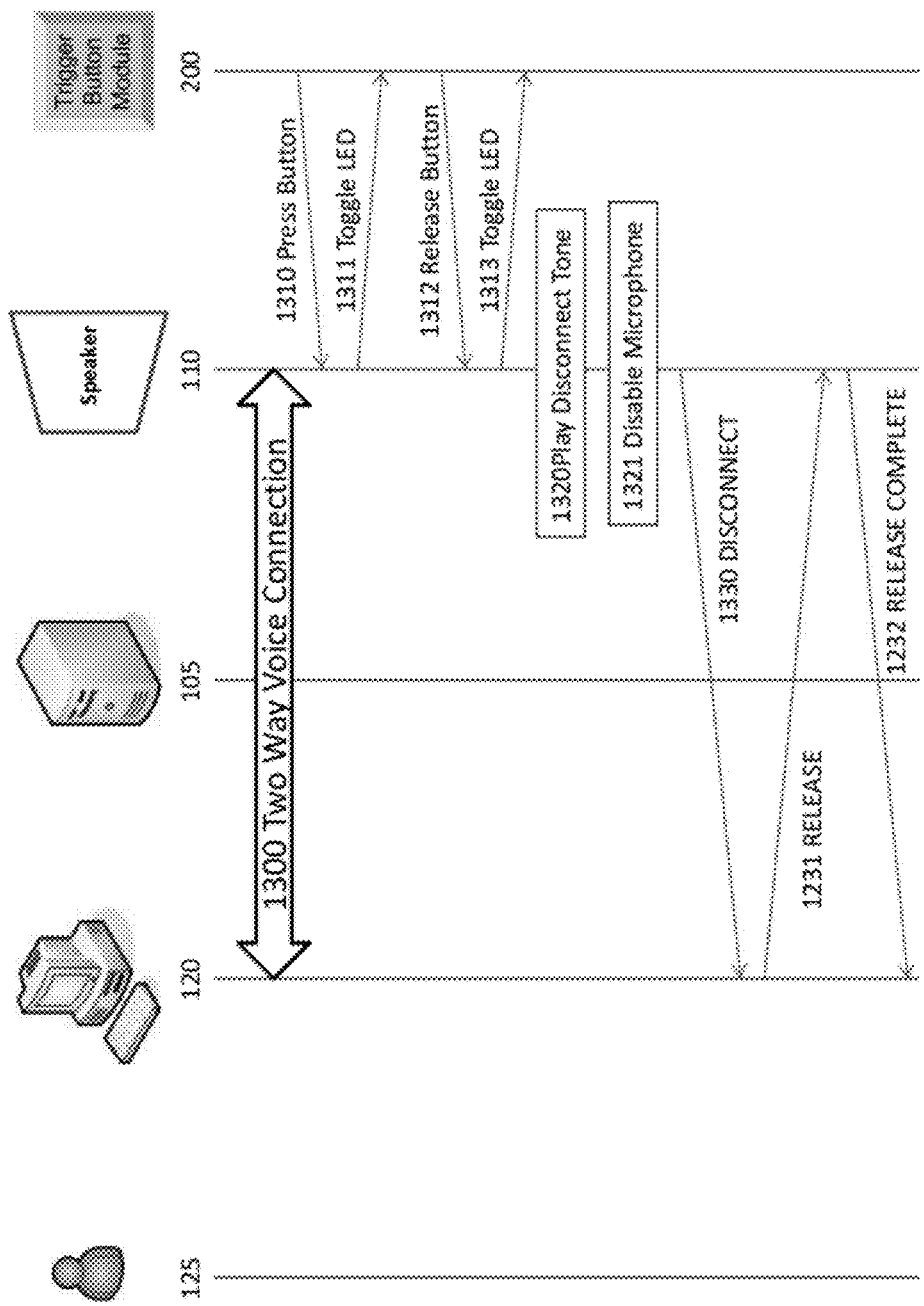
FIG. 12 is a diagram which demonstrates how a user pressing the trigger button can terminate a dynamic audio link to a live operator.

FIG. 11 details the process when the live operator 125 terminates the session. Once the live operator 125 terminates the call (1210), the client device sends a DISCONNECT message to the speaker 110 (1211). When this is received, the speaker 110 plays a disconnect tone audible to the user of the trigger button module 200 (1220) and disables the microphone (1221). The speaker 110 then releases all resources related to the dynamic audio link and sends a RELEASE indication to the client device 120 (1230). The client device cleans up its local resources and completes the link termination process by sending a RELEASE COMPLETE indication to the speaker 110 (1231). The speaker 110 can then update the MNMC 105 with its new state so that its status can be updated in the floor plan as well as with other affected system resources.

The user of the trigger button module 200 can also terminate the dynamic audio link in the basic profile. This is completed by the user pressing (1310) and releasing (1312) the button on the trigger button module 200. The speaker provides a visual indication that it has received the button press by turning on (1311) and turning off (1314) the LED on the trigger button module 200. The speaker 110 then plays a disconnect tone to the user of the trigger button module 200 (1320) and disables the microphone (1321). After this or concurrent to this step, the speaker 110 releases all resources related to the dynamic audio link and sends a DISCONNECT indication to the client device 120 (1330). The client device 120 receives the DISCONNECT and releases all of its local resources dedicated to the dynamic audio link. The client device then sends a RELEASE indication to the speaker 110 (1231) to indicate that it is finished with the link. To complete the handshake, the speaker 110 sends a RELEASE COMPLETE (1232), indicating that all resources related to the dynamic audio link have been released. The speaker 110 can then update the MNMC 105 with its new state.

For some applications, accidental termination of the triggered event is undesirable. In these cases, the speaker 110 implements a state machine to debounce button presses. The key objectives of this state machine are to ensure the following:

A connected call can be disconnected by the live operator at any time

Figure 13:
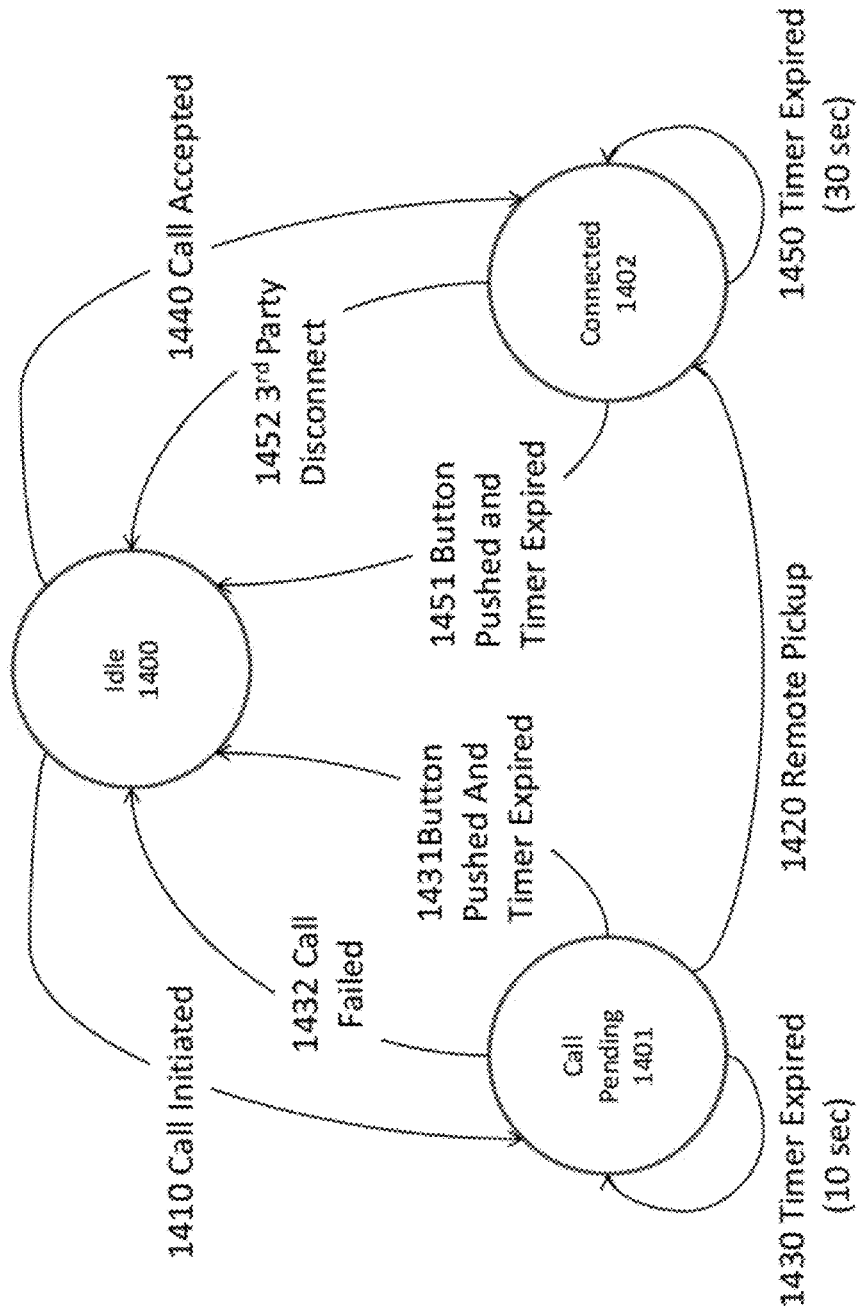
FIG. 13 is an exemplary state machine for debouncing trigger button module presses to ensure that a call is not prematurely terminated.

Otherwise, the call must be connected for more than 10 seconds, before allowing to be disconnected by a button press FIG. 13 illustrates a state machine to debounce the trigger button module 200 presses. The state machine has 3 states: Idle 1400 which indicates that no emergency call is currently open or pending; Call Pending 1401 which indicates that the trigger button module 200 has been pressed and is in the process of establishing a dynamic audio link; and Connected 1402 which indicates that the trigger button module 200 is actively engaged in a call (note that it does not matter how this call has been initiated). In the Idle 1400 state, the speaker 110 will respond to the trigger button module 200 immediately. In the Call Pending State 1401, the speaker 110 will only respond to a trigger button module press after its state timer has expired. In this embodiment, this timer has been set to 30 seconds; however, this limit may be configurable as part of the speaker 110's profile. While the speaker's state timer is running, the trigger button module 200 is ignored in the Connected State 1402. As such, transition events 1431 and 1451 can only occur after the state timer has expired. Again, all time periods can be configurable as part of the speaker 110's profile.

The remainder of the events for the state machine is driven by the current call state associated with the trigger button module 200, the current call state being determined by the speaker 110. When a call is initiated by the trigger button module 200, the state machine transitions from the Idle 1400 to the Call Pending state 1401 by way of state event 1410. This starts the timer in the Call Pending State 1401. This call can transition automatically to the Idle state (1400) if for some reason, the call fails (1432) or to the Connected state (1450) if the call is answered (1420). If a call is received by the speaker 110, and the call is one that does not require a button press to confirm, the state machine transitions from the Idle state (1400) to the Connected state (1402) directly. Once the Connected State (1402) is reached, the state timer is started. The trigger button module will remain in the Connected state (1402) for the duration of this call. The call can be terminated by the live operator at any time (1452) or it can be terminated locally by the user of the trigger button module 200 after the Connected State timer has expired and after the button is pressed (1451).

Another option to prevent accidental disconnection is to completely disable the trigger button in the trigger button module 200 until is it manually reset by security. The reason for this approach is that, in an emergency situation, the user may panic and push the trigger button multiple times. If a call can be cancelled simply by a second button press, frantic users who push the button multiple times in succession may not end up placing the call. To avoid this situation, the system may be configured so that, once the button is pressed, the emergency call is placed and the call cannot be terminated by anyone other than authorized personnel who are trained in the specific reset sequence.

The above description regarding the operation of the trigger button module 200 assumes that the trigger button module is setting up a session to a live operator 125. Given the flexibility of IP systems, other functionalities are possible. The configuration as to how the trigger button module 200 is used or how it sets up calls and the destination of its calls (e.g. whether all calls are to be routed through a live operator, through the MNMC) can be determined by the implementation details of the trigger button module. These details can be determined by how the mass notification system is to be used. For example, instead of enabling the trigger button module 200 microphone to be coupled to the dynamic audio link as the link is being established, the speaker 110 could record the audio activity picked up by the microphone in the area around the trigger button module as the dynamic link establishment is proceeding. This could be useful to the live operator if the user of the trigger button module 200 is not available to respond once the dynamic audio link has been established. Another option is to store the call in its entirety on the speaker 110 and cache these for a period of time. Other IP enabled system, such as computers or phones, can retrieve these calls if they are required for analysis.

Figure 14:
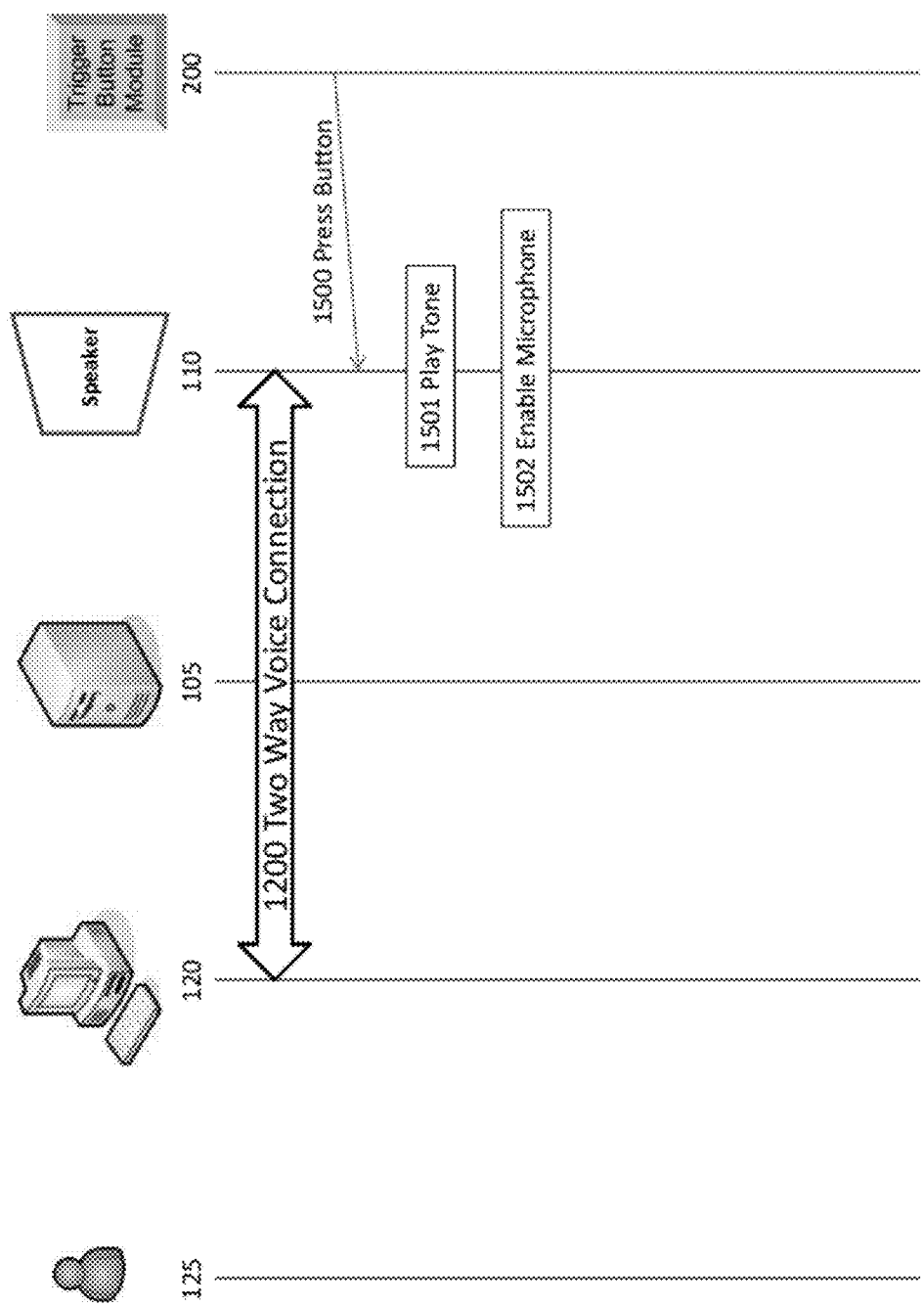
FIG. 14 is an illustration which demonstrates how a user pressing the trigger button module can initiate a push-to-talk function.
Figure 15:
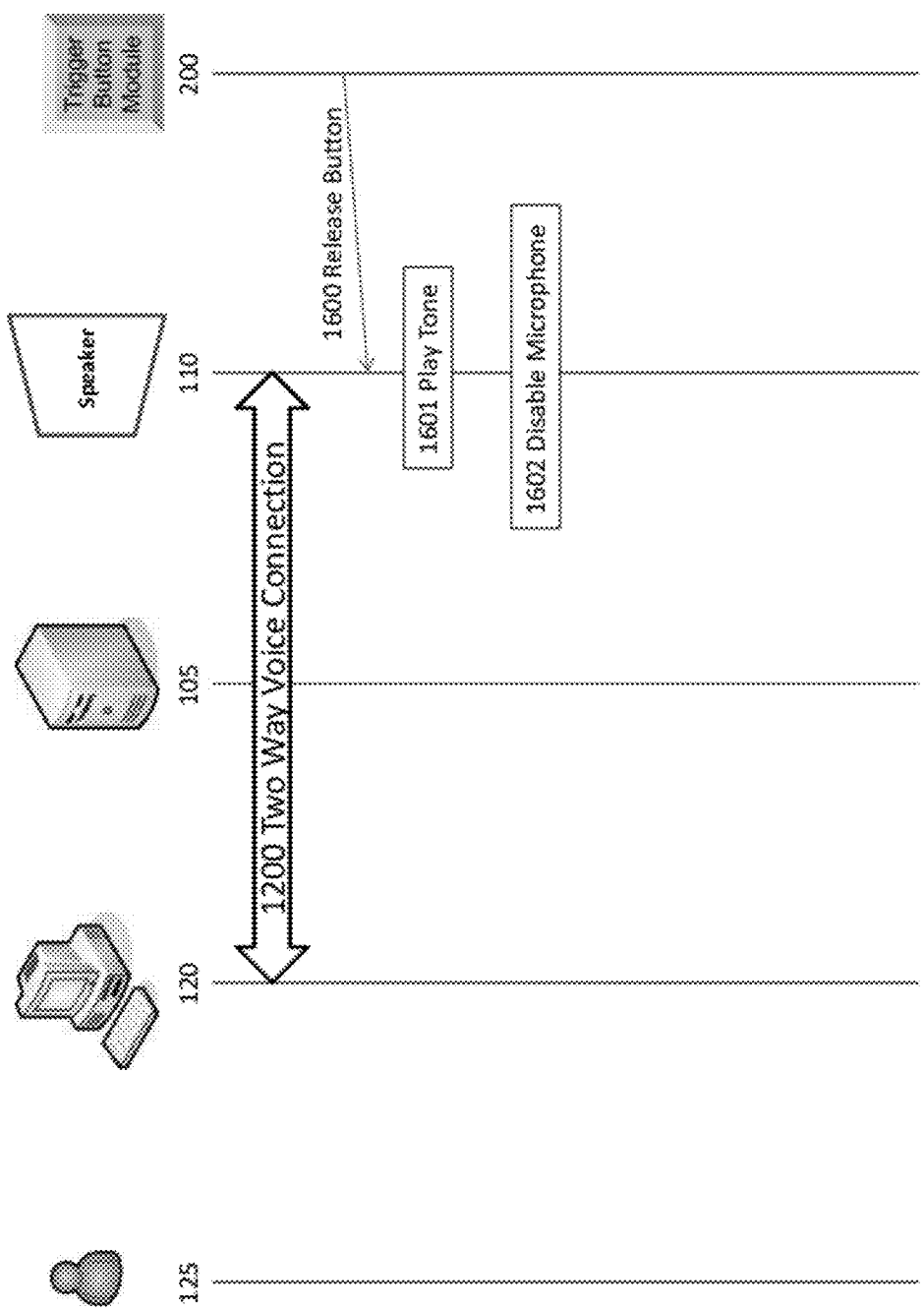
FIG. 15 is an illustration which demonstrates how a user releasing the trigger button module can terminate a push-to-talk function.

Other options can allow the trigger button module 200 to operate as a "push-to-talk" system which allows the user to send voice messages to a specified location. FIG. 14 and FIG. 15 show an exemplary "push-to-talk" implementation which uses a statically connected voice path and local muting to allow each end to speak. When the user has completed their voice message, the microphone on the local end is muted. Other strategies may be employed to implement the same functionality. For example, dynamic audio links could be dynamically established and cached for a period of time. Another embodiment may record the user message locally and then perform a file transfer to transmit the message. The destination of the file transfer could come from the message itself using a simple command structure.

The implementation that uses the flow diagram in FIG. 14 specifically uses the trigger button as activating the local microphone for speech. The "push-to-talk" session starts by a user pressing and holding the trigger button module 200 (1500). The speaker 110 indicates the button has been pressed by playing a tone (1501) and enables microphone 315 on the trigger button module 200. At this point, the user can start the voice message. When the user's message is completed, the button is released (1600) as shown in FIG. 15. At this point, the speaker 110 plays a tone (1601) and disables microphone 315 (1602) on the trigger button module 200.

In another embodiment, there are two microphones—one in the speaker and another in the trigger button module. For this embodiment, the correct microphone listening device to be used for an established session may depend on the state of the trigger button module 200 and/or the state of the speaker 110. In a simple case, if a button is pressed, the microphone on the trigger button module can be set as the active microphone. The trigger button module 200 microphone can also be used if the speaker 110 triggers a call to specific phone numbers. As an example, the activation of the trigger button may initiate a telephone call from the speaker to a specific telephone number (e.g. emergency services, 911). In this example, the microphone on the trigger button module would be activated so that the user can communicate with the person at the other end of the telephone call. As can be imagined, the destination communications device (in this example a telephone set) can be any communications device capable of communicating with the MNMC. The destination communications device can therefore be a client device (as illustrated in the Figures), a device used by the live operator, a telephone device automatically called by the activation of the button, or any other communications device. In another example, the speaker can be seen as an IP connected communications device and can be called. Activating the button on the trigger button module would answer calls being made to the specific speaker and would activate a relevant microphone.

Figure 16:
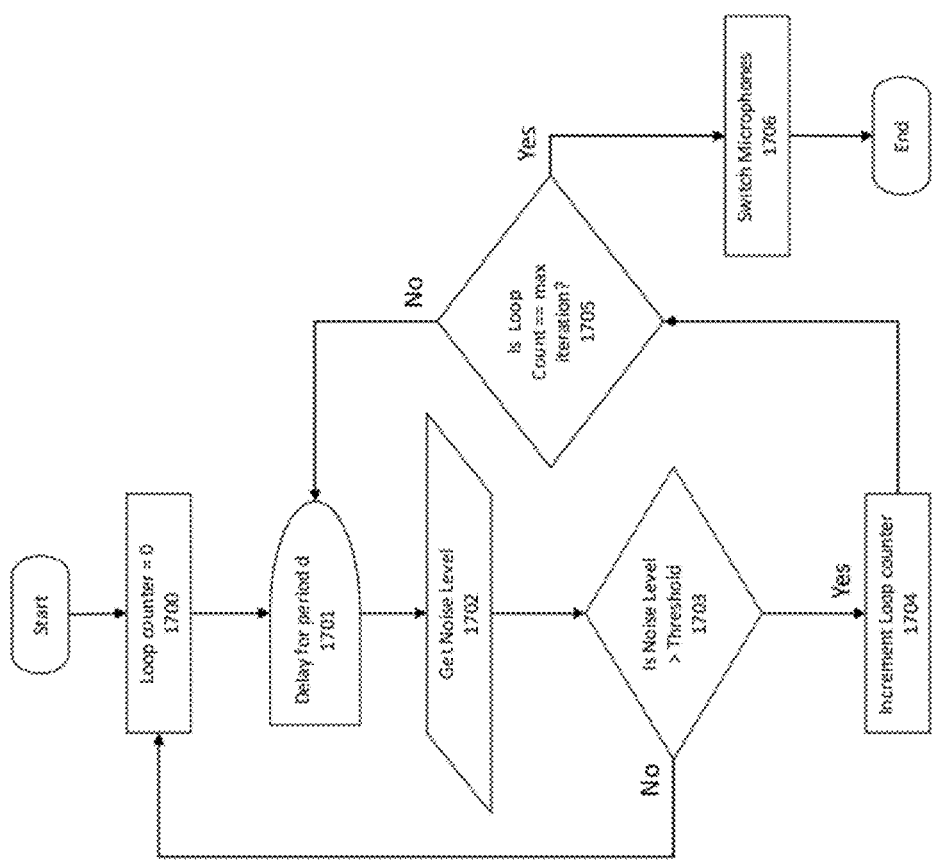
FIG. 16 is a flow chart demonstrating how the speaker Control Module automatically selects the microphone used for a trigger button module session.

Another embodiment could allow the speaker 110 to automatically switch between the local microphone on the speaker and the trigger button module 200 microphone based upon predetermined policy or configuration. FIG. 16 is a flowchart detailing the steps in a method where speaker 110 selects which microphone to use for an active call session. This flowchart starts by initializing a loop counter (1700) and then delaying for a configurable period, d (1701). Once the delay expires, a sample of the current noise level (1702) is taken and this is compared to a provisioned threshold (1703). If the noise level does not exceed the threshold, no action is required and the method returns to step 1700 to begin again. If the level exceeds the threshold, the loop counter is incremented (1704) and the method delays again. If the high noise level persists for a predetermined number of iterations (1705), then the microphone is switched in step 1706 and another microphone is thereby selected.

Figure 17:
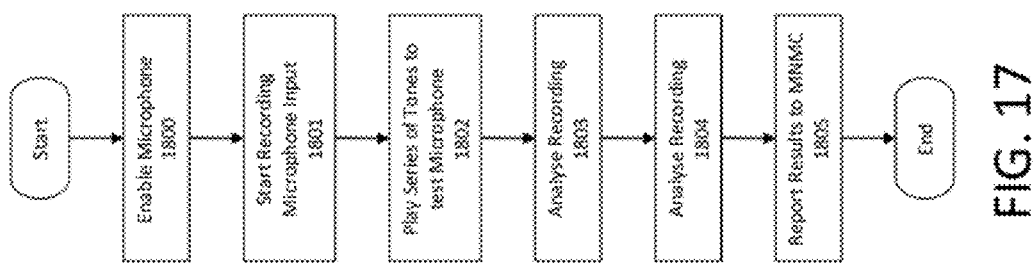
FIG. 17 is a flow chart demonstrating how the speaker Control Module can automatically test trigger button module functions.

Given the complexity of a distributed IP system, automated maintenance functions are required to ensure that the trigger button module 200 system is ready to handle emergency situations. The flowchart for one embodiment of an automated microphone testing method used for the speaker 110 is shown in FIG. 17. The test routine starts by enabling the microphone (1800) and directs the input of the microphone to a file (1801). The speaker 110 plays a series of tones through the speaker (1802). Once the tones are complete, the speaker 110 analyses the recording file (1803), generates a report (1804) and sends the results to the MNMC 105 (1805). Note that this method can be used to test the microphone resident on the speaker 110 or the microphone resident on the trigger button module 200.

Figure 18:
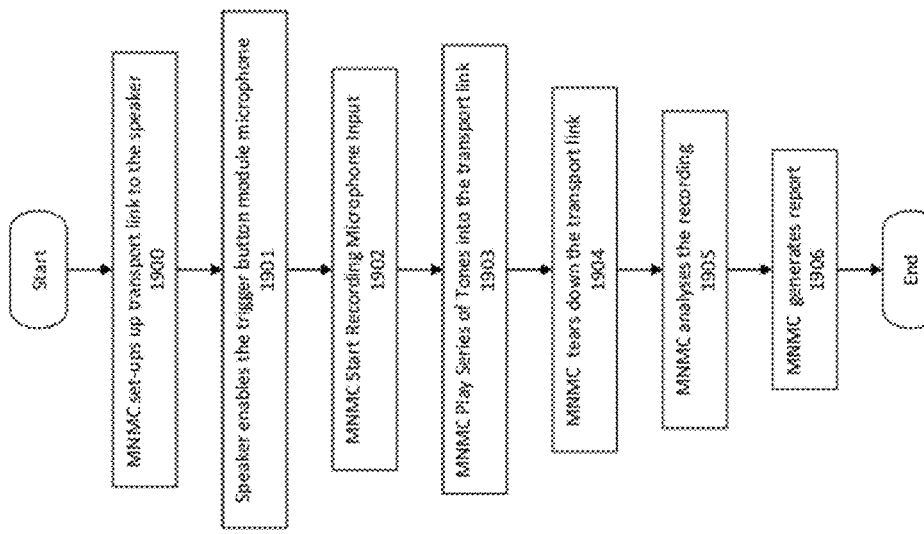
FIG. 18 is a flow chart demonstrating how the MNMC 105 can test trigger button module functions.

Another option is to have the MNMC 105 perform the microphone testing on the trigger button module 200. The steps in this method are illustrated in FIG. 18. This process begins with the MNMC 105 creating a dynamic audio link to the speaker 110 (1900) and the speaker 110 enables the trigger button module's 200 microphone 315 (1901). Once the link is established, the MNMC 105 starts playing a series of tones through the speaker 110 (1902). The MNMC then records the tones as they are received by the microphone 315 at the associated trigger module 200 (1903). Afterwards, the MNMC then tears down the transport path once the tones are complete (1904). The MNMC analyses the recording (1905) and generates a report (1906).

Figure 19:
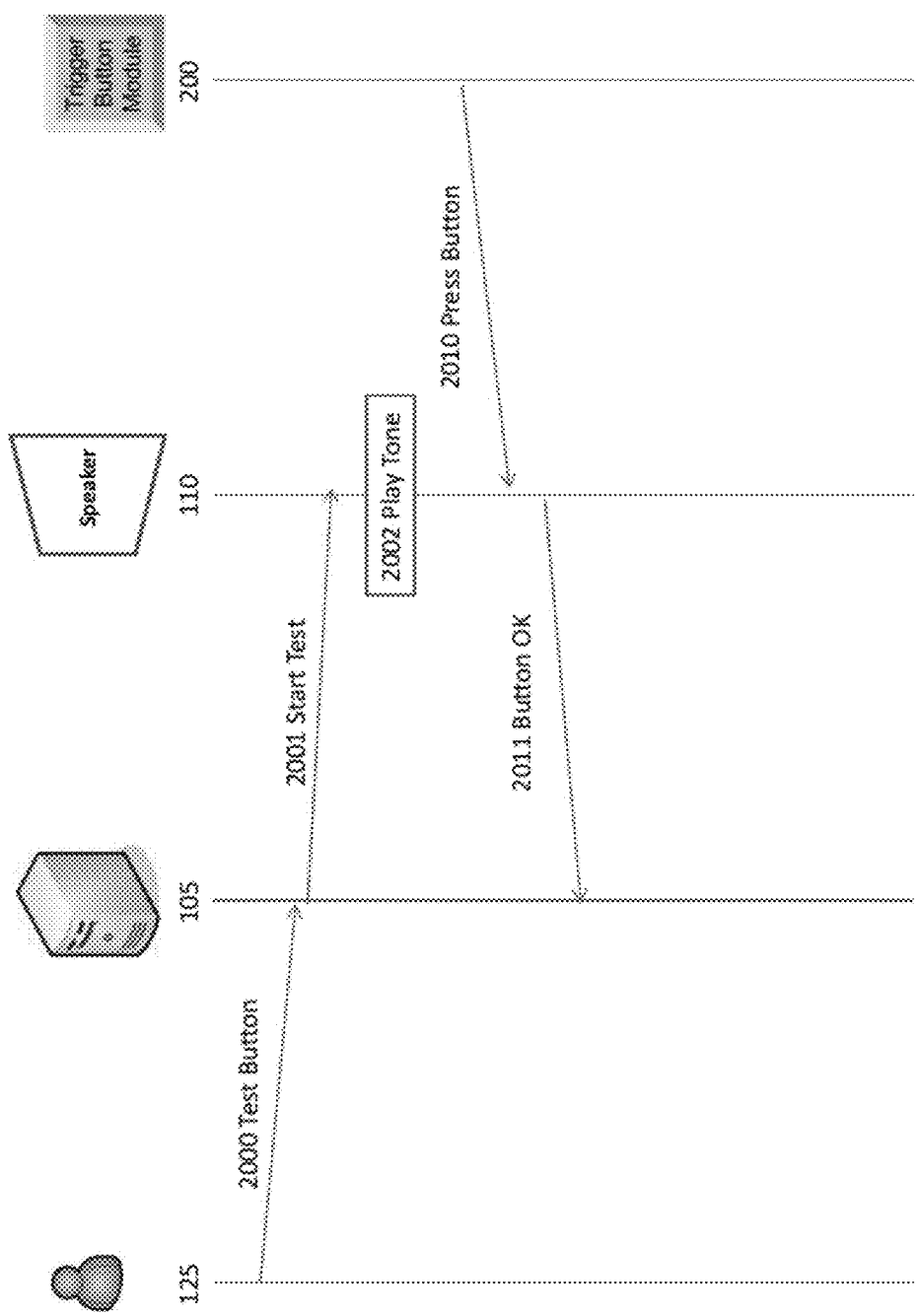
FIG. 19 is an illustration which demonstrates how a trigger button module maintenance test may be performed.

A complementary method is useful for testing the button itself. A policy could be structured to enforce a manual inspection of a set of the trigger button module 200 per period of time. FIG. 19 shows a flow diagram for an embodiment of such a test. A live operator can initiate a test on a specified the trigger button module 200 (2000) and the MNMC then instructs the associated speaker 110 to start the test (2001) by playing a set of tones (2002). These tones will persist until a person presses the button on the trigger button module 200 in a preset sequence (2010). At this point, the speaker 110 declares the test a success and reports the results to the MNMC 105 (2011).

The above-described embodiments of the present invention are intended to be examples only. Alterations, modifications and variations may be effected to the particular embodiments by those of skill in the art without departing from the scope of the invention, which is defined solely by the claims appended hereto.

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A device for use in communicating with a Mass Notification Management Center (MNMC), the device comprising:
   a trigger button module comprising a first microphone and at least one activatable button;
   a remote speaker comprising a second microphone, the speaker for producing audio audible to a user of said device;
   a connector connecting the trigger button module to the speaker;
   wherein said speaker is Internet Protocol (IP) capable and is remotely controllable to produce said audio;
   wherein said device is intended for mass audio communications;
   wherein said trigger button module triggers at least one predefined action related to communications between said speaker and a destination communications device,
   wherein said communications comprises placing a call between said speaker and said destination communications device using an IP link establishment protocol;
   wherein said speaker communicates status of said trigger button module to said MNMC;
   wherein a Uniform Resource Identifier (URI) is accessed when said at least one activatable button is activated;
   wherein the speaker receives an audio message sent to a plurality of speakers;
   and wherein
   either the first microphone or the second microphone is used depending on at least one of:
      (1) state of the trigger button module, and
      (2) state of said corresponding speaker connected to the trigger button module.

2. A device according to claim 1 wherein an activation of at least one activatable button executes a command related to said communications between said speaker and said destination communications device.

3. A device according to claim 2 wherein an activation of said at least one activatable button activates an audio link between said device and a live operator.

4. A device according to claim 2 wherein an activation of said at least one activatable button activates an audio link between said device and a user of a mass notification system, said MNMC being a component of said mass notification system.

5. A device according to claim 2 wherein said speaker further comprises a control module for controlling functions of said trigger button module;
   wherein said control module selects between said first microphone and said second microphone when an active audio connection is initiated,
   said selecting based on one of:
      (1) state of the trigger button module,
      (2) state of the speaker, and
      (3) noise level of either the first or second microphone.

6. A method for initiating a communications link between a speaker and a destination client device:
   said speaker one of a plurality of speakers being intended for mass audio communications;
   the method comprising:
   a) detecting, by the speaker, an activation of a trigger button on a remote trigger button module;
   b) transmitting a setup communication from said speaker to a management server, said setup communication being in compliance with an IP link establishment protocol;
   c) receiving an alert communication from said destination client device;
   d) activating a microphone of the trigger button module for a user at a location of said speaker, said speaker comprising a second microphone;
   e) establishing an audio communications path between said speaker and said destination client device, said audio communications path established being in compliance with an IP link establishment protocol; and f) communicating status of said trigger button module to said management server;

wherein a Uniform Resource Identifier (URI) is accessed when said trigger button is activated; and wherein either the first microphone or the second microphone is used depending on at least one of:
(1) state of the trigger button module, and
(2) state of said corresponding speaker.

7. A method according to claim 6 wherein said destination client device is used by a live operator such that a user of said speaker is in voice communication with said live operator after said audio communication path is established.

8. A device according to claim 2, wherein said internet protocol (IP) link establishment protocol is the Session Initiation Protocol;

said MNMC provisions the handling of activation of the at least one activatable button; and said provisioning is stored.

9. A method according to claim 6, wherein said internet protocol (IP) link establishment protocol is the Session Initiation Protocol, and further comprising:

g) communicating to the MNMC that the trigger button module is present.

10. A method according to claim 9, wherein said internet protocol (IP) link establishment protocol uses H.323 style link establishment primitives, and further comprising:

h) provisioning the handling of activation of the trigger button; and i) storing said provisioning in a speaker profile.

11. The device of claim 1, wherein said device is deployed at a location within either an enterprise or a campus.

12. A mass audio notification system comprising:

a Mass Notification Management Center (MNMC);

a plurality of destination communication devices connected to said MNMC via a network;

a plurality of speakers interconnected with said MNMC via said network, wherein each of said plurality of speakers is Internet Protocol (IP) capable and is remotely controllable to produce audio, and wherein each of said plurality of speakers receives an audio message from the MNMC for mass audio communications; and a corresponding one or more remote trigger button modules connected to a corresponding one of said plurality of speakers, each of the one or more trigger button modules coupled to a corresponding speaker using a connector, wherein said corresponding one or more trigger button modules triggers at least one predefined action related to communications between the corresponding speaker and said at least one of the plurality of destination communications devices, wherein said communications comprise:
establishing an audio link between said corresponding speaker and said at least one destination communications device using an IP link establishment protocol, and placing at least one call over an audio link between said corresponding speaker and said at least one destination communications devices and wherein each of said corresponding one or more trigger button modules comprises at least one activatable button; wherein a Uniform Resource Identifier (URI) is accessed when said at least one activatable button is activated;

wherein one of said corresponding one or more trigger button modules comprises a microphone; and wherein said corresponding speaker comprises a second microphone; and either the first microphone or the second microphone is used depending on at least one of:
(1) state of the one of said corresponding one or more trigger button modules, and
(2) state of said corresponding speaker.

13. The system of claim 12 wherein said plurality of speakers is deployed in a plurality of locations around a campus, and said corresponding speaker communicates statuses of said corresponding one or more trigger button modules to said MNMC.

14. The system of claim 13 wherein said corresponding one or more trigger button modules are used to signal security associated with said campus.

15. The system of claim 13, wherein said destination communications devices comprises one or more client devices; and said MNMC receives one or more instructions from said one or more client devices to broadcast one or more audio messages to said plurality of speakers.

16. The system of claim 15, wherein said plurality of speakers comprises a plurality of subsets, and wherein each subset comprises one or more speakers; and said MNMC broadcasts a different audio message to each of the plurality of subsets.

17. The system of claim 12, wherein said plurality of speakers is deployed in a plurality of locations around either
(1) an enterprise, or
(2) a campus.

18. The system of claim 12, wherein said at least one predefined action comprises launching a broadcast.

19. The system of claim 12, wherein said corresponding speaker stores said placed at least one call in its entirety for future retrieval.

20. The system of claim 12, wherein said corresponding speaker records audio activity picked up by said microphone while said audio link is being established.

21. The system of claim 12, wherein a voice message is recorded using said microphone; and said voice message is transmitted.

22. The system of claim 12, wherein said transmission occurs using a file transfer.

23. The system of claim 12, wherein either the first microphone or the second microphone is used based on a predetermined policy.

24. The system of claim 12 wherein said corresponding speaker performs debouncing for said activatable button.

25. The system of claim 23, further wherein a threshold noise level is associated with said predetermined policy.

* * * * *